United States Patent
Lemcke et al.

(10) Patent No.: US 8,996,472 B2
(45) Date of Patent: *Mar. 31, 2015

(54) VERIFICATION OF STATUS SCHEMAS BASED ON BUSINESS GOAL DEFINITIONS

(75) Inventors: Jens Lemcke, Karlsruhe (DE); Bernhard Thimmel, Edingen-Neckarhausen (DE); Otfried von Geisau, Sinsheim (DE); Andreas Friesen, Steinfeld (DE); Piergiorgio Bertoli, Civezzano (Trento) (IT); Marco Pistore, Trento (IT)

(73) Assignee: SAP SE, Walldorf (DE)

( * ) Notice: Subject to any disclaimer, the term of this patent is extended or adjusted under 35 U.S.C. 154(b) by 32 days.

This patent is subject to a terminal disclaimer.

(21) Appl. No.: 13/447,419

(22) Filed: Apr. 16, 2012

(65) Prior Publication Data

US 2013/0275389 A1    Oct. 17, 2013

(51) Int. Cl.
G06F 17/30 (2006.01)
G06Q 10/00 (2012.01)
G06Q 10/10 (2012.01)

(52) U.S. Cl.
CPC ............... *G06Q 10/00* (2013.01); *G06Q 10/10* (2013.01)
USPC ............. 707/687; 707/601; 707/802; 706/12; 706/45

(58) Field of Classification Search
CPC .......... G06F 17/2725; G06F 17/30292; G06Q 10/067
USPC ........................ 707/601, 687, 700; 706/45, 12
See application file for complete search history.

(56) References Cited

U.S. PATENT DOCUMENTS

| | | |
|---|---|---|
| 5,212,792 A | 5/1993 | Gerety et al. |
| 5,295,222 A | 3/1994 | Wadhwa et al. |
| 5,404,496 A | 4/1995 | Burroughs et al. |
| 5,555,415 A | 9/1996 | Allen |
| 5,652,714 A | 7/1997 | Peterson et al. |
| 5,671,360 A | 9/1997 | Hambrick et al. |
| 5,758,029 A | 5/1998 | Hall |

(Continued)

FOREIGN PATENT DOCUMENTS

| | | |
|---|---|---|
| EP | 1674990 A1 | 6/2006 |
| WO | WO2005117549 A3 | 12/2005 |
| WO | WO2008000499 A2 | 1/2008 |

OTHER PUBLICATIONS

Piergiorgio Bertoli et al., "S&AM Verification, Formal Framework," Jan. 17, 2011, 14 pages.*

(Continued)

*Primary Examiner* — Robert Beausoliel, Jr.
*Assistant Examiner* — Alexandria Bromell
(74) *Attorney, Agent, or Firm* — Fish & Richardson P.C.

(57) ABSTRACT

Methods, systems, and computer-readable storage media for evaluating a validity of a status and action management (SAM) schema. In some implementations, actions include receiving the SAM schema, the SAM schema being stored as a computer-readable document in memory, providing one or more goals, each goal representing an intention of the SAM schema, the one or more goals being provided in a computer-readable document stored in memory and including one or more primary goals and one or more recovery goals that each express an intention of a process underlying the SAM schema, and processing the one or more goals using a computer-executable model checking tool for evaluating the validity of the SAM schema.

13 Claims, 5 Drawing Sheets

(56) References Cited

U.S. PATENT DOCUMENTS

| | | | |
|---|---|---|---|
| 5,781,545 A | 7/1998 | Matthew | |
| 5,801,687 A | 9/1998 | Peterson et al. | |
| 5,890,146 A | 3/1999 | Wavish et al. | |
| 5,920,718 A | 7/1999 | Uczekaj et al. | |
| 5,983,016 A | 11/1999 | Brodsky et al. | |
| 5,991,733 A | 11/1999 | Aleia et al. | |
| 6,078,325 A | 6/2000 | Jolissaint et al. | |
| 6,151,023 A | 11/2000 | Chari | |
| 6,175,837 B1 | 1/2001 | Sharma et al. | |
| 6,182,277 B1 | 1/2001 | DeGroot et al. | |
| 6,308,224 B1 | 10/2001 | Leymann et al. | |
| 6,324,496 B1* | 11/2001 | Alur et al. | 703/17 |
| 6,408,262 B1* | 6/2002 | Leerberg et al. | 703/2 |
| 6,442,515 B1 | 8/2002 | Varma et al. | |
| 6,480,955 B1 | 11/2002 | DeKoning et al. | |
| 6,553,403 B1 | 4/2003 | Jarriel et al. | |
| 6,681,383 B1 | 1/2004 | Pastor et al. | |
| 6,760,733 B1 | 7/2004 | Komine et al. | |
| 6,769,048 B2 | 7/2004 | Goldberg et al. | |
| 6,772,036 B2 | 8/2004 | Eryurek et al. | |
| 6,973,460 B1 | 12/2005 | Mitra | |
| 7,117,293 B1 | 10/2006 | Graziano et al. | |
| 7,120,896 B2 | 10/2006 | Budhiraja et al. | |
| 7,191,149 B1 | 3/2007 | Lanham et al. | |
| 7,437,374 B2* | 10/2008 | Chen et al. | 707/707 |
| 7,451,447 B1 | 11/2008 | Deshpande | |
| 7,577,681 B1 | 8/2009 | Rozenman et al. | |
| 7,606,791 B2 | 10/2009 | Dettinger et al. | |
| 7,613,993 B1 | 11/2009 | Baer et al. | |
| 7,617,483 B2 | 11/2009 | Vigelius et al. | |
| 7,761,337 B2 | 7/2010 | Caballero et al. | |
| 7,797,708 B2 | 9/2010 | Weber et al. | |
| 8,020,172 B2 | 9/2011 | Kraft et al. | |
| 8,055,527 B1 | 11/2011 | Gil et al. | |
| 8,200,715 B1 | 6/2012 | Kraft et al. | |
| 8,219,650 B2 | 7/2012 | Krasinskiy et al. | |
| 8,386,996 B2 | 2/2013 | Prigge et al. | |
| 8,515,794 B2 | 8/2013 | Duparc et al. | |
| 8,521,621 B1 | 8/2013 | Hetzer et al. | |
| 8,522,261 B2 | 8/2013 | Kraft et al. | |
| 8,526,743 B1* | 9/2013 | Campbell et al. | 382/218 |
| 8,527,517 B1* | 9/2013 | Ait-Mokhtar | 707/738 |
| 8,601,490 B2 | 12/2013 | Sureshan et al. | |
| 8,645,228 B2 | 2/2014 | Moussa et al. | |
| 8,694,557 B2 | 4/2014 | Thimmel et al. | |
| 8,706,776 B1 | 4/2014 | Kraft et al. | |
| 2002/0013777 A1 | 1/2002 | Diener | |
| 2002/0038206 A1 | 3/2002 | Dori | |
| 2002/0062475 A1 | 5/2002 | Iborra et al. | |
| 2002/0083413 A1 | 6/2002 | Kodosky et al. | |
| 2002/0138290 A1 | 9/2002 | Metcalfe et al. | |
| 2002/0152102 A1 | 10/2002 | Brodersen et al. | |
| 2002/0167544 A1* | 11/2002 | Raghavan et al. | 345/763 |
| 2002/0194388 A1 | 12/2002 | Boloker et al. | |
| 2003/0018461 A1 | 1/2003 | Beer et al. | |
| 2003/0018508 A1 | 1/2003 | Schwanke | |
| 2003/0028858 A1 | 2/2003 | Hines | |
| 2003/0046658 A1 | 3/2003 | Raghavan et al. | |
| 2003/0050813 A1 | 3/2003 | Cohen et al. | |
| 2003/0074090 A1 | 4/2003 | Becka et al. | |
| 2003/0074371 A1 | 4/2003 | Park et al. | |
| 2003/0195789 A1 | 10/2003 | Yen | |
| 2004/0027388 A1 | 2/2004 | Berg et al. | |
| 2004/0049436 A1 | 3/2004 | Brand et al. | |
| 2004/0059808 A1 | 3/2004 | Galloway et al. | |
| 2004/0078258 A1 | 4/2004 | Schulz et al. | |
| 2004/0083448 A1 | 4/2004 | Schulz et al. | |
| 2004/0139104 A1 | 7/2004 | Kuntz et al. | |
| 2004/0181775 A1 | 9/2004 | Anonsen et al. | |
| 2004/0193510 A1 | 9/2004 | Catahan et al. | |
| 2004/0220956 A1 | 11/2004 | Dillon | |
| 2004/0225919 A1 | 11/2004 | Reissman et al. | |
| 2004/0233232 A1 | 11/2004 | Iborra et al. | |
| 2005/0004888 A1 | 1/2005 | McCrady et al. | |
| 2005/0004951 A1 | 1/2005 | Ciaramitaro et al. | |
| 2005/0010504 A1 | 1/2005 | Gebhard et al. | |
| 2005/0137928 A1 | 6/2005 | Scholl et al. | |
| 2006/0069605 A1 | 3/2006 | Hatoun | |
| 2006/0085681 A1 | 4/2006 | Feldstein et al. | |
| 2006/0095439 A1 | 5/2006 | Buchmann et al. | |
| 2006/0136923 A1 | 6/2006 | Kahn et al. | |
| 2006/0179383 A1* | 8/2006 | Blass et al. | 714/738 |
| 2006/0227350 A1 | 10/2006 | Crawford et al. | |
| 2006/0265691 A1 | 11/2006 | Klinger et al. | |
| 2006/0294158 A1 | 12/2006 | Tsyganskiy et al. | |
| 2007/0142935 A1* | 6/2007 | Danielsson et al. | 700/29 |
| 2007/0156427 A1 | 7/2007 | Dentzer et al. | |
| 2007/0226025 A1 | 9/2007 | Chang et al. | |
| 2007/0240168 A1* | 10/2007 | Guschina et al. | 719/318 |
| 2007/0250766 A1* | 10/2007 | Medi et al. | 715/513 |
| 2007/0282570 A1* | 12/2007 | Thompson et al. | 703/2 |
| 2007/0282916 A1 | 12/2007 | Albahari et al. | |
| 2008/0005061 A1 | 1/2008 | Kraft et al. | |
| 2008/0005152 A1 | 1/2008 | Kraft et al. | |
| 2008/0005153 A1 | 1/2008 | Kraft et al. | |
| 2008/0005162 A1 | 1/2008 | Kraft et al. | |
| 2008/0005625 A1 | 1/2008 | Kraft et al. | |
| 2008/0005739 A1 | 1/2008 | Sadiq et al. | |
| 2008/0005743 A1 | 1/2008 | Kraft et al. | |
| 2008/0005747 A1 | 1/2008 | Meyer et al. | |
| 2008/0015883 A1 | 1/2008 | Hermann | |
| 2008/0046453 A1* | 2/2008 | Kostoulas et al. | 707/707 |
| 2008/0046862 A1 | 2/2008 | Sattler et al. | |
| 2008/0097990 A1* | 4/2008 | Mustafa | 707/707 |
| 2008/0162672 A1 | 7/2008 | Krasinskiy et al. | |
| 2008/0164908 A1* | 7/2008 | Challenger et al. | 326/46 |
| 2008/0313212 A1* | 12/2008 | Yu et al. | 707/102 |
| 2009/0006150 A1 | 1/2009 | Prigge et al. | |
| 2009/0006943 A1* | 1/2009 | Matheson et al. | 715/234 |
| 2009/0089309 A1 | 4/2009 | Thimmel et al. | |
| 2010/0100518 A1* | 4/2010 | Andrade et al. | 706/47 |
| 2010/0161676 A1 | 6/2010 | Kazmaier et al. | |
| 2010/0262902 A1* | 10/2010 | Burns | 715/234 |
| 2011/0161926 A1* | 6/2011 | Cruise et al. | 717/113 |
| 2011/0179088 A1* | 7/2011 | Medi et al. | 707/803 |
| 2013/0275389 A1 | 10/2013 | Lemcke et al. | |
| 2014/0006291 A1 | 1/2014 | Buecheler et al. | |
| 2014/0040217 A1 | 2/2014 | Lemcke et al. | |
| 2014/0058905 A1 | 2/2014 | Kahn et al. | |

OTHER PUBLICATIONS

Piergiorgio Bertoli et al., "S&AM Verification, Formal Framework," Jan. 17, 1011, 14 pages.*

U.S. Appl. No. 12/634,834, filed Dec. 10, 2005, Extending Status Models in a Computer System, Kraft et al.

U.S. Appl. No. 12/634,996, filed Dec. 10, 2005, Using Status Models with Adaptable Process Steps in a Computer System, Kraft et al.

U.S. Appl. No. 13/567,544, filed Aug. 6, 2012, Checking Compatibility of Extended and Core SAM Schemas Based on Complex Goals, Lemcke et al.

U.S. Appl. No. 13/875,539, filed May 2, 2013, Validation of Functional Correctness of SAM Schemas including Action Chains, Lemcke et al.

U.S. Appl. No. 13/887,453, filed May 6, 2013, Validating SAM Schemas Based on Business Functionalities, Lemcke et al.

Egon Börger et al., "A Method for Verifiable and Validatable Business Process Modeling," Advances in Software Engineering, Lecture Notes in Computer Science 5316, 2008, pp. 59-115.

Farhana H. Zulkernine et al., "A Constraint-Driven Business Object Model for Service-Based Business Processes," Proceedings of the Ninth International Conference on Information Technology—New Generations, ITNG'12, Apr. 2012, pp. 182-188.

Object Management Group (OMG), "Business Process Modeling Notation, V1.1", Jan. 17, 2008, 318 pages.

Nathan S. Caswell et al., "Agility=Change+Coordination," Proceedings of the Seventh IEEE International Conference on E-Commerce Technology Workshops, CECW 2005, Jul. 2005, pp. 131-139.

DOT Language and Graphviz Graph Processing Tools [online], retrieved on Nov. 21, 2012 from http://www.graphviz.org, 3 pages.

Carsten Hentrich et al., "Patterns for Business Object Model Integration in Process-Driven and Service-Oriented Architectures," Pro- (56) References Cited

OTHER PUBLICATIONS ceedings of the Pattern Languages of Programs (PLoP '06), Oct. 2006, 14 pages.
IBM, "Service Data Objects, WorkManager, and Timers: IBM and BEA Joint Specifications Overview," Nov. 30, 2005, retrieved from http://www.ibm.com/developerworks/library/specification/j-commonj-sdowmt/index.html, 3 pages.
Chris Kanaracus, "Business Objects bets on convergence in IT tools" InfoWorld, Aug. 12, 2008, http://www.infoworld.com/d/security-central/business-objects-bets-convergence-in-it-tools-699, 2 pages.
Prabir Nandi et al., "Adaptive Business Objects—A New Component Model for Business Integration," Proceedings of the 7th International Conference on Enterprise Information Systems, ICEIS 2005, May 2005, pp. 179-188.
Quyen L. Nguyen et al., Agile Business Objects Management Application for Electronic Records Archive Transfer Process. Proceedings of the Balisage: The Markup Conference, Aug. 2009, 16 pages.
NuSMV: A symbolic model checker [online], retrieved on Nov. 21, 2012 from http://nusmv.fbk.eu, 4 pages.
Oasis, "Web Services Business Process Execution Language Version 2.0," Public Review Draft 02, Nov. 2006, pp. 282.
Marco Pistore et al., "A Minimalist Approach to Semantic Annotations for Web Processes Compositions," Proceedings of the 3rd European Semantic Web Conference, ESWC'06, Jun. 2006, Lecture Notes in Computer Science 4011, pp. 620-634.
Karsten Riemer, "A Process-Driven, Event-Based Business Object Model," Proceedings of the Second International Enterprise Distributed Object Computing Workshop, EDOC '98, Nov. 1998, pp. 68-74.
Dumitru Roman et al., "Web Service Modeling Ontology," Applied Ontology, vol. 1, 2005, pp. 77-106.
Oumaima Saidani et al., "A Role-Based Approach for Modeling Flexible Business Processes," Proceedings of the Workshop on Business Process Modeling, Development, and Support (BPMDS'06) in association with CAiSE'06, Jun. 2006, pp. 111-120.
John Beatty et al., "Next-Generation Data Programming: Service Data Objects," A Joint Whitepaper with IBM and BEA, Nov. 2003, 15 pages.
Piergiorgio Bertoli et al., S&AM Verification—Formal Framework, Jan. 17, 2011, 14 pages.
Frank Michael Kraft et al., U.S. Appl. No. 12/634,834, entitled "Extending Status Models in a Computer System," filed Dec. 10, 2009 (including specification, claims, abstract and drawings).
Frank Michael Kraft et al., U.S. Appl. No. 12/634,996, entitled "Using Status Models with Adaptable Process Steps in a Computer System," filed Dec. 10, 2009 (including specification, claims, abstract and drawings).
Alessandro Cimatti, et al., "NuSMV 2: An OpenSource Tool for Symbolic Model Checking ". In Proceeding of International Conference on Computer-Aided Verification (CAV 2002). Copenhagen, Denmark, Jul. 27-31, 2002, 9 pages.
'Unified Modeling Language: Superstructure Version 2.0' [online]. Object Management Group, 2005, [retrieved on Nov. 27, 2006]. Retrieved from the Internet: <URL: www.omg.org/docs/formal/05-07-04.pdf>, pp. 8-12.
'Status Management' [online]. SAP, [retrieved on Nov. 27, 2006]. Retrieved from the Internet: <URL: help.sap.com/saphelp_47x200/helpdata/en/ee/41f79346ee11d189470000e829fbbd/content.htm>, 2 pages.
Status Management [online]. SAP, [retrieved on Nov. 27, 2006]. Retrieved from the Internet: <URL: help.sap.com/saphelp_47x200/helpdata/en/f0/ca3965260211d28a430000e829fbbd/content.htm>, 1 page.
'User Status' [online]. SAP, [retrieved on Nov. 27, 2006]. Retrieved from the Internet: <URL: help.sap.com/saphelp_47x200/helpdata/en/f0/ca39a6260211d28a430000e829fbbd/content.htm>, 1 page.
'Workflow Management Coalition the Workflow Reference Model' [online]. Workflow Management Coalition, 1995, [retrieved on Nov. 27, 2006]. Retrieved from the Internet: <URL: www.wfmc.org/standards/docs/tc003v11.pdf>, 55 pages.
'Introduction to OMG's Unified Modeling Language TM (UML ®)' [online]. Object Management Group, 2005 [retrieved on Nov. 26, 2006]. Retrieved from the Internet: <URL: omg.org/gettingstarted/what_is_uml.htm>, 16 pages.
Leavens, Gary T. et al., "Preliminary Design of JML: A Behavioral Interface Specification Language of Java," ACM SIGSOFT Software Engineering Notes, vol. 31, No. 3, May 2006, pp. 1-38.
Kiczales, Gregor et al., "An Overview of AspectJ," Lecture notes in Computer Science, Springer Verlag, Berlin, Germany, vol. 2072, Jun. 18, 2001, pp. 327-353.
Jason Zhicheng Li, "Business Object State Management Using State Machine Compiler," Internet Citation, May 1, 2006 (May 2, 2006), XP002396380, Retrieved from the internet: http://today.java.ne/pub/a/today/2006 /01/05/business-object-state management-using-smc.html, retrieved Aug. 24, 2006, 8 pages.
Eric Armstrong, "How to implement state-dependent behavior—Doing the State pattern in Java," internet citation, XP002246628 ISSN: 1091-8906, Retrieved from the internet: http://222.javaworld.com/javaworld/jw-08-1997/jw-08-stated_p.html, retrieved on Jul. 7, 2003, 5 pages.
W.M.P. van der Aaslt and M. Pesic, "DecSerFlow: Towards a Truly Declarative Service Flow Language", in M. Bravetti, M. Nunez, and G. Zavattaro, editors, International Conference on Web Services and Formal Methods (WS-FM 2006), vol. 4184 of Lecture Notes in Computer Science, pp. 1-23, Springer-Verlag, Berlin, 2006.
Lohman et al., "Behavioral Contraints for Services", Business Process Management, 5th International Conference, BPM, 2007, Brisbane, Australia, 16 pages.
Holger Giese, "Object-Oriented Design and Architecture of Distributed Systems", Inaugural-Dissertation, Department of Mathematics and Computer Science, Faculty of Mathematics and Natural Science, Westfälischen Wilhelms-Universität Münster, for the degree of Doctor of Science, Feb. 2001, 327 pages.
Beugnard et al., "Making Components Contract Aware", IEEE Computer Society, Jul. 1999, pp. 38-45.
Wirtz et al., "The OCoN Approach to Workflow Modeling in Object-Oriented Systems", Information Systems Frontiers 3:3, 357-376, 2001.
"Unified Modeling Language: Superstructure", Version 2.0, formal/Jul. 4, 2005, Object Management Group, Aug. 2005, 694 pages.
"Unified Modeling Language: Superstructure", Version 2.1.1 (non-change bar), formal/Feb. 5, 2007, Object Management Group, Feb. 2007, 716 pages.
"Object Constraint Language", OMG Available Specification, Version 2.0, formal/May 1, 2006, Object Management Group, May 2006, 232 pages.
Baldan et al., "Functorial Concurrent Semantics for Petri Nets and Read and Inhibitor Arcs", Lecture Notes in Computer Science, vol. 1877, Proceedings of the 11th International Conference on Concurrency Theory, Springer-Verlag, 2000, 15 pages.
"Business Process Modeling Notation Specification", Final Adopted Specification, dtc/Feb. 1, 2006, Object Management Group, Feb. 2006, 284 pages.
S. Christensen and N. Hansen, "Coloured Petri Nets Extended with Place Capacities, Test Arcs and Inhibitor Arcs", Lecture Notes in Computer Science, vol. 691, Proceedings of the 14th International Conference on Application and Theory of Petri Nets, Springer-Verlag, 1993, 21 pages.
S. Stelting et al., "Applied Java Patterns" (Online), Dec. 26, 2001, Prentice Hall, retrieved from the internet: http://proquest.safaribooksonline.com/0130935387?tocview=true>, retrieved Aug. 7, 2009), 11 pages.
International Search Report and Written Opinion of the International Searching Authority issued on Nov. 30, 2007, in corresponding application PCT/EP2007/005785, 14 pages.
International Search Report and Written Opinion of the International Searching Authority issued in PCT/EP2007/005783 on Jan. 7, 2009, 14 pages.
International Search Report and Written Opinion of the International Searching Authority issued in PCT/EP2007/005779 on Dec. 30, 2008, 14 pages.

(56) References Cited

OTHER PUBLICATIONS

International Search Report and Written Opinion of the International Searching Authority issued in PCT/EP2007/005782 on Dec. 30, 2008, 14 pages.
International Search Report and Written Opinion of the International Searching Authority issued in PCT/EP2007/005786 on Jan. 8, 2009, 15 pages.
International Search Report and Written Opinion of the International Searching Authority issued in PCT/EP2007/005784 on Dec. 29, 2008, 11 pages.
International Search Report and Written Opinion of the International Searching Authority issued in PCT/EP2007/005781 on Dec. 30, 2008, 15 pages.
Extended European Search Report issued in 07025131.9-1243 / 1939744 on Aug. 19, 2009, 5 pages.
Merriam-Webster Online, "Programmatically—Definition and More from the Free Merriam Webster" downloaded Jun. 16, 2010, http://www.merriam-webster.com/dictionary/programmatically, 2 pages.
"Unified Modeling Language: Infrastructure", Version 2.1.1 (without change bars), formal/Feb. 6, 2007, Object Management Group, Feb. 2007, 220 pages.

* cited by examiner

VERIFICATION OF STATUS SCHEMAS BASED ON BUSINESS GOAL DEFINITIONS

BACKGROUND

Businesses are increasingly service-driven, where a service can, for example, represent a part of or a complete business process. In some examples, the business process depicts the lifecycle of a business object (BO). A number of actions constrained by a set of business policies can result in the BO transitioning from an initial state to a final state during its lifecycle. Constraints can vary for different customized business processes. The validity of a business process can depend on the ability of a BO to reach a final state.

SUMMARY

Implementations of the present disclosure include computer-implemented methods for evaluating a validity of a status and action management (SAM) schema. In some examples, methods include the actions of receiving the SAM schema, the SAM schema being stored as a computer-readable document in memory, providing one or more goals, each goal representing an intention of the SAM schema, the one or more goals being provided in a computer-readable document stored in memory and including one or more primary goals and one or more recovery goals that each express an intention of a process underlying the SAM schema, and processing the one or more goals using a computer-executable model checking tool for evaluating the validity of the SAM schema.

In some implementations, actions further include providing a finite state machine (FSM) based on the SAM schema, the FSM representing states of the SAM schema and transitions between states, the FSM being provided as a computer-readable document and being stored in memory, wherein processing further includes processing the FSM.

In some implementations, processing the FSM and the one or more goals includes generating one or more traces, each trace defining a path of status vectors and actions that are possible through the SAM schema.

In some implementations, processing the FSM and the one or more goals further includes: determining that at least one status vector of a primary goal of the one or more goals appears in at least one trace, determining that every maximal finite trace of the one or more traces ends in a status vector of any goal, determining that from every status vector of any infinite trace, a status vector of any goal is reachable, and, in response, indicating that the SAM schema is valid.

In some implementations, processing the FSM and the one or more goals further includes: determining that no status vector of a primary goal of the one or more goals appears in any trace, and, in response, indicating that the SAM schema is invalid.

In some implementations, processing the FSM and the one or more goals further includes: determining that at least one maximal finite trace of the one or more traces does not end in a status vector of a goal, and, in response, indicating that the SAM schema is invalid.

In some implementations, processing the FSM and the one or more goals further includes: determining that from at least one status vector of any infinite trace, a status vector of any goal is not reachable, and, in response, indicating that the SAM schema is invalid.

In some implementations, each state is associated with a status vector, the status vector being defined as a set of variable values.

In some implementations, each transition is associated with an action that can be performed to change a status vector.

In some implementations, the SAM schema represents constraints on actions that can be performed to transition between states.

In some implementations, a primary goal represents a desired goal of the process and a recovery goal represents an acceptable goal of the process.

In some implementations, the process includes a business process.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to modeling intentions of a business process that is expressed in a status and action management (SAM) schema as goals, and validating the SAM schema against the goals. More particularly, intentions of the business process can be modeled as one or more primary goals and one or more recovery goals. In some examples, a finite state machine (FSM) is provided based on the SAM schema. The one or more primary goals and the one or more recovery goals are validated against the FSM to determine whether the SAM schema, and thus the underlying business process, correctly fulfills the intentions for which the business process is provided. In some examples, the SAM schema is valid if the SAM schema can potentially reach every primary goal, or, if the SAM schema cannot reach a primary goal, the SAM schema at least reaches a recovery goal. In some examples, the SAM schema is invalid if the SAM schema cannot reach every primary goal, and the SAM schema cannot reach a recovery goal in lieu of a primary goal. In short, the present disclosure provides a constraint-driven general model (SAM schema) with a verification process, the model addresses challenges associated with correctness of the constraints with respect to specified business goals.

Figure 1:
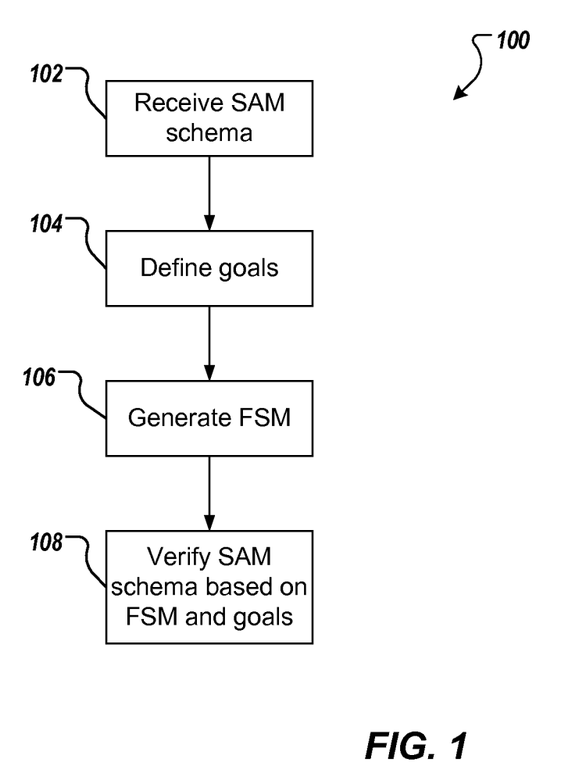
FIG. 1 depicts an example process in accordance with implementations of the present disclosure.

FIG. 1 depicts an example process 100 in accordance with implementations of the present disclosure. In some implementations, the example process 100 can be provided using one or more computer programs that are executed using one or more computing devices.

A SAM schema is received (102). In some examples, the SAM schema can be provided as a computer-readable document that is received from computer-readable memory. For example, the SAM schema can be provided in a machine-readable specification language, discussed in further detail herein. A FSM is generated (104). In some examples, the FSM is generated based on the SAM schema and can be provided as computer program code. One or more goals of the SAM schema are defined (106). In some examples, the one or more goals represent intensions of the SAM schema and can be defined in a machine-readable specification language. The SAM schema is verified based on the FSM and the one or more goals (108). In some examples, the FSM and the one or more goals are provided to a computer-executable model checking tool as respective computer-readable documents. The computer-executable model checking tool processes the FSM and the one or more goals, as discussed in further detail herein, to determine a validity of the SAM schema.

In general, SAM schemas provide a consistent approach to status modeling and implementation activities of data objects (e.g., a business object (BO), or business object node (BON)). More particularly, a SAM schema can be defined at design-time and can be provided as a schema model that is stored in computer-readable medium. The SAM schema includes preconditions for performing actions with each precondition identifying how a status affects whether an action is allowed to be performed at runtime by a data object node instance having the status. A status schema instance is created for a particular object node instance that is used in a computer-based process. The status schema instance corresponds to the status schema model.

In some examples, one or more BOs can be associated with a business process and can be manipulated during execution of the business process. In some examples, manipulation of a BO can result in the BO transitioning from one status to another status. In some examples, a BO is provided as a hierarchical structure of BO nodes (BONs). In some examples, BON can correspond to a header of the BO, and one or more BONs can correspond to respective one or more items that make up the BO. As used herein, reference to a SAM schema of a BO can indicate a SAM schema of a BON (e.g., the SAM schema can refer to a header or an item of a BO, or the BO itself, as applicable).

In some examples, during execution of a business process, a method that changes attribute values of the BO can be executed. Consequently, the BO (e.g., a BON of the BO) can transition from one status to another status. In some examples, a status can be defined as the combination of the current attribute values of a BON at a given point in time. In some examples, a status of the BO can be defined based on the respective statuses of the BONs that make up the BO. In some examples, an attribute of BON can be classified into categories. Example categories can include standard attributes (e.g., a customer name) and status variables. In some examples, status variables are additional attributes that describe milestones in a lifecycle of the BON. Status variables can provide an aggregated and interpreted view of the status of the BON. In some examples, the status of a BON can be defined based on the values of the status variables at a given point in time. In some examples, the status can be provided as a BO attribute and a modeled entity of SAM that represents the lifecycle of a BON (the result of a processing step). Consequently, a status variable specifies a certain milestone in the lifecycle of a BON (e.g., "order confirmed"). In terms of the business process, this status is indicative of the current status of the business process. Accordingly, a status is a named result of a process step within the business process that is a precondition for a following process step.

During the lifecycle of a BO, the BO can enter various statuses. In order to change a status, an action can be performed on the BO. In some examples, it is not desirable to enable state changes from any status to any other status and/or to enable actions with any status as a precondition for a state change. Consequently, the SAM schema refines a BO (BON) model, discussed in further detail below, in terms of a constraint-based model that governs the lifecycle of the BO (BON). In some examples, the SAM schema is intended to define all possible statuses of a BON, possible actions that can be performed on the BON, the resulting statuses, and preconditions in terms of statuses that have to be reached to perform a certain action. In other words, the SAM schema provides a constraint-based model that defines constraints between statuses and actions. Consequently, the SAM schema is a status schema model type. In some examples, a status schema includes the status variables of a BON, the possible status transitions to the values of these status variables (i.e., triggered by actions) and of preconditions that guard changes to the status variables. At design time, for a given BON, various status schemas can be defined and, when the BON is initialized, one of the status schemas is selected and loaded into the runtime. During runtime (e.g., execution of the modeled process), status changes of a BO occur as they are modeled. Consequently, it can be ensured that no changes other than modeled changes occur and required changes actually do occur. In order to do so, the SAM schema (constructed during the design time) is loaded and evaluated at runtime. Accordingly, a SAM schema describes the expected runtime behavior of a BON in a certain business context and represents the relationship between the status of a BON and its actions, and actual variable values provided during runtime can be compared to the SAM schema to ensure the the modeled process is executed as expected.

In summary, a status schema can include multiple elements. Example elements include the multi-valued status variables, the actions, and edges that define a relationship between a status value and an action. As discussed above, the status variables and the corresponding values represent the status of a BON, where a status variable contains multiple possible status values. At runtime, every status variable will have exactly one of the possible status values at any given time. The actions represent the methods that can be performed on the BON. For any given action, whether the action is allowed to be performed can depend on the current status of the BON. The edges represent preconditions that connect status values with actions. The preconditions provide that the actions can only be executed if the status variables have certain required values. However, preconditions do not lead to automatic execution of the corresponding actions (i.e., just because a precondition for a particular action is fulfilled, the particular action is not automatically executed). In some examples, if an action that is allowed by the preconditions is called, the action changes the state of the BO and executes exactly one of possibly several status transitions that originate therefrom. In some examples, edges can be provided between one status value of one variable to another status value of another variable, indicating that one status update directly triggers another status update (e.g., synchronizing).

In some implementations, example elements of a status schema can include advanced modeling elements. In some examples, advanced modeling elements can extend simple SAM modeling. By way of non-limiting example, an advanced modeling element can enable creation of a header status by aggregating various item status values.

Intentions of the business process can be modeled as one or more primary goals and one or more recovery goals. For example, the primary goals and the recovery goals reflect the intention behind building the SAM schema (e.g., the purpose of the SAM schema). Each of the primary goals and the recovery goals can be represented as a set of status vectors. In some examples, and as discussed in further detail herein, each of the primary goals and the recovery goals can be further represented using wildcards and/or logic operators. In some examples, a primary goal can be provided as a tuple of status values (optionally including wildcard(s) and/or logic operator(s)) that achieve a goal of the business process (i.e., a desired outcome). In some examples, a recovery goal can be provided as a tuple of status values (optionally including wildcard(s) and/or logic operator(s)) that achieve an acceptable goal of the business process (i.e., an acceptable outcome). In some examples, an acceptable goal can be intermediate to achieving an end goal of the business process and vice versa. Examples are discussed in further detail below.

A FSM can be generated based on the SAM schema. In some implementations, the FSM includes nodes and edges between nodes. In some examples, a root node of the FSM can represent an initial status (e.g., of a BON) and non-root nodes (e.g., intermediate nodes and/or leaf nodes) can represent final outcomes of status transitions (i.e., primary goals and/or recovery goals). Intermediate nodes (e.g., child nodes of the root node and/or intermediate nodes) can each represent an intermediate status (e.g., of the BON) between the initial status and the goals. In some examples, intermediate nodes can represent the goals. Edges between nodes can represent actions that can be performed to transition from one status to another status.

As discussed in further detail herein, the FSM can be processed to determine whether the SAM schema correctly fulfills the intentions under which the SAM schema was built (i.e., the SAM schema meets its goal). From a business perspective, a SAM schema meets its goal if the SAM schema can potentially reach every primary goal. If, under some circumstances, the schema cannot reach a primary goal, the SAM schema should at least end up in a recovery goal. In some examples, loops can be present in the SAM schema. In some examples, if the loop repeatedly ends at a primary goal or a recovery goal, the loop is okay and the SAM schema is still considered valid. Formally, a schema meets a goal if and only if the following example conditions hold: at least one status vector of every primary goal appears in at least one trace; every maximal finite trace ends in a state vector of any primary goal or recovery goal; and from every status vector(s) of every infinite trace (i.e., loop), a status vector of any primary goal or recovery goal is reachable starting from the status vector(s) (e.g., by the same trace or another trace).

Implementations of the present disclosure are discussed in further detail herein with reference to an example context. The example context includes a service-based business processes, a sales order business process in particular. It is appreciated, however, that implementations of the present disclosure are applicable to other contexts.

In the evolving world of service-based business processes, there is an increasing demand on customizability and reliability. A service can be perceived as a part of or a complete business process. A service can be composed of a series of atomic actions that perform small tasks. The actions can move a BO from one state, or status, to another status. In some examples, the BO can be a product in supply-chain management or an item of sale in an online store. In some examples, status changes can occur by executing an action during the business process. A number of possible goals in such business processes can be defined by some final states (e.g., product shipped, order cancelled). Executability of the actions and firing of the events are constrained or guided by strict business rules, which can vary for different customers.

Figure 2A:
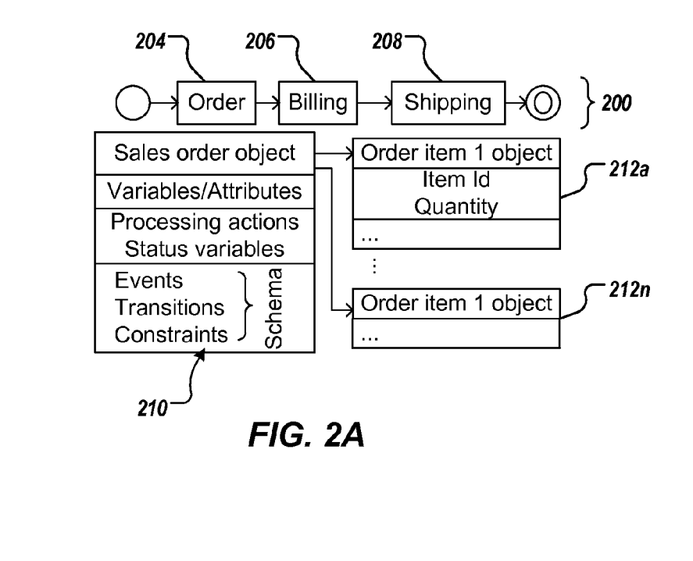
FIG. 2A depicts an example context within which implementations of the present disclosure can be applied.

FIG. 2A depicts an example context within which implementations of the present disclosure can be applied. The example context includes a service-based business processes, a sales order business process 200, in particular. The example sales order business process 200 includes an order sub-process 204, a billing sub-process 206 and a shipping sub-process 208. In the examples context, a sales order object 210 (i.e., sales order BO) is provided and is linked to multiple sales item objects 212a-212n. Actions are provided and are controlled by business constraints, as discussed in further detail below with reference to FIG. 3. Each action can move the sales order object 210 through the order sub-process 204, the billing sub-process 206 and the shipping sub-process 208.

At any point in the sales order business process 200, the status of a BO is defined by a set of status variables. In the example context, an example status variable can be provided as Status_Order. Potential values of the Status_Order status variable within the order sub-process 204 can include "not started," "saved," "submitted" and "cancelled." Example actions that cause the sales order BO to move from one status to another during the order sub-process 204 can include "create," "modify," "submit" and "cancel." In some examples, the order sub-process 204 can be projected as an order service. Consequently, the actions provided within the order sub-process 204 can define the lifecycle of the sales order BO. To ensure reliability of such business processes, the constraints can be validated, as discussed herein, so that the sales order BO moves through the correct execution statuses and ends up one of the primary goal or recovery goal statuses.

Figure 2B:
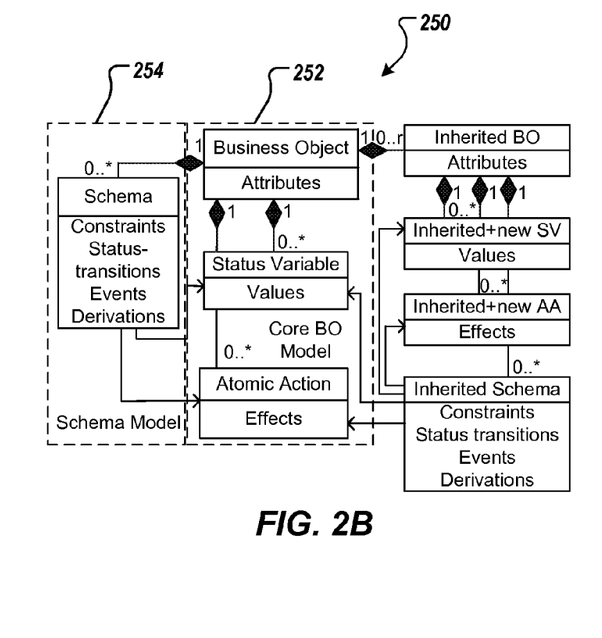
FIG. 2B depicts an example object model.

FIG. 2B depicts an example object model 250. The example object model 250 is provided as a BO model that includes a core BO model 252 and a constraint-driven life-cycle model 254 referred to as the SAM schema model. In some examples, the core BO model 252 describes static features or components associated with the BO, and the SAM schema model 254 describes the dynamics, or lifecycle, of the BO. The multi-part modeling of the present disclosure enables the added flexibility of attaching different SAM schema models to the same BO model for the different business cases. Further, the BO and the schema can be extended as needed without affecting the core BOs. The constraints are defined based on execution statuses, where status transitions are caused by actions and events.

As discussed in detail above, a BO can include attributes or variables. The attributes are initialized at the time of instantiation of the BO and can assume different values during the business process that acts on the BO. In the example of FIG.

2A, the sales order BO 210 in the sales order business process 200 can include attributes such as Order ID, number of order items, and delivery date. As also discussed above, a BO is associated with a number of status variables (SV), each SV representing the status of the BO during a sub-process of the lifecycle of the BO and having a set of values associated therewith, including an initial value. In the example context, the Status_Order SV can assume one of the four values "not started," "saved," "submitted" and "cancelled." The status variables of a BO together represent the combined status or state of the BO. During the business process, actions are performed that cause status transitions. In the example object model 250 of FIG. 2B, actions can be referenced as atomic actions (AA). In the example context, the "create" action moves the BO from the "not started" status to the "saved" status.

In some examples, a SV can be affected by several AAs, while an AA only affects a single SV or no SV at all. In some examples, the effect of an AA on a SV can be deterministic or non-deterministic (i.e., the AA sets the SV always to a specific value, or to one of several possible values depending on some user input or attributes of the BO). In the example context, the "modify" action can displays options and, based on user input selecting an option, moves the BO non-deterministically to either the "saved" status or the "submitted" status.

Status transitions are caused by actions, events, and/or derivations. In some examples, an event is fired when a SV has a certain value, and causes a specific status transition that can be used to synchronize the values of different SVs. For example, a "cancelled" status value of a Status_Billing SV, discussed in further detail below, causes an event to be fired to reset, and thereby synchronize the value of the Status_Order SV to "saved." For example, and with reference to FIG. 2A, when the billing sub-process 206 is cancelled, an example pre-defined business rule can state that the order should still be saved to allow the user to modify the order and continue with the billing sub-process 206 at a later point.

In some examples, a derivation is provided as a means to dynamically determine status information from multiple SVs. A derivation also enables distribution of the status information of a parent BO to multiple descendent BOs and modeling dependencies among BOs. For example, and with reference to FIG. 2A, if an order is cancelled, the status of all items (e.g., order items 212a-212n) can also be set to "cancelled."

The BO model of the present disclosure provides a strong foundation for designing flexible and customizable business processes to meet varying consumer requirements. The BO model further provides a general framework that can be extended for different types of BOs.

Figure 3:
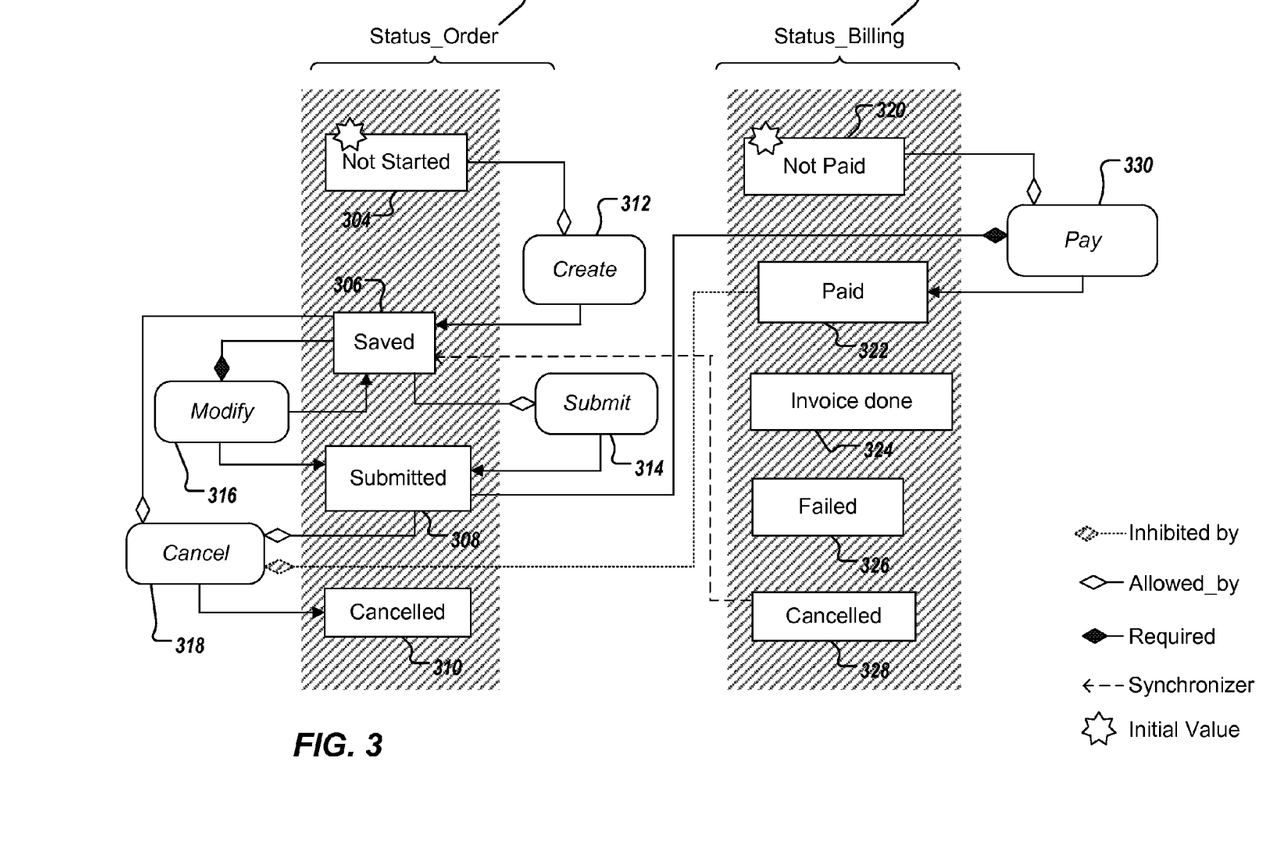
FIG. 3 depicts example constraints on actions that can be executed in the example context of FIG. 2A.

FIG. 3 depicts example constraints on actions that can be executed in the example context of FIG. 2A. More particularly, FIG. 3 depicts a Status_Order SV 300 and a Status_Billing SV 302. Example values for the Status_Order SV 300 include "not_started" 304, "saved" 306, "submitted" 308 and "cancelled" 310. Example actions that can be executed to transition the Status_Order SV 300 between values include "create" 312, "submit" 314, "modify" 316 and "cancel" 318. Example values for the Status_Billing SV 302 include "not_paid" 304, "paid" 322, "invoice_done" 324, "failed" 326 and "cancelled" 328. Example actions that can be executed to transition the Status_Billing SV 300 between values include "pay" 330.

FIG. 3 provides a graphical representation of constraint types that can be defined in the example BO model (e.g., of FIG. 2B). In the depicted example, an action is enabled if any one of the "Allowed_by" and all of the "Required" conditions (constraints) are true, and all of the "Inhibited_by" conditions (constraints) are false. Each of these conditions can be more complex if, for example, values of multiple SVs are joined using logical operators (e.g., AND, OR). In the example constraints of FIG. 3, "cancel" 318, which affects the value of the Status_Order SV 300, is executable when the Status_Order SV 300 has the value of either "saved" OR "submitted" AND the Status_Billing SV 302 does not have the value "paid" 322 (i.e., payment has not been made).

In some implementations, the BO model depicts a SAM model and can be defined using a machine-readable specification language. An example specification language can be denoted by the acronym SAMLA (e.g., SAM LAnguage). In the example context, an example specification can be provided as:

```
BON BusinessObj {
    STATUS_VARS Order, Billing, Shipping
    VARIABLE Order
        VALUES not_started, saved, submitted, cancelled
        INITIAL not_started
    VARIABLE Billing
        VALUES not_paid, invoice_done, paid, failed, cancelled
        INITIAL not_paid
    ACTIONS ACT_Create, ACT_Modify, ACT_Submit,
        ACT_Cancel, ACT_Pay,...
    SCHEMAS Schema1
}
``` where a BON represents a BO model. Generally, and as depicted in the example above, a BON specification defines the list of SVs, the set of values for each SV including the initial value, the AAs, and schemas associated with the BO. In some implementations, an example schema model can be provided as:

```
SCHEMA Schema1 {
    ACTION ACT_Create
        ALLOWED_BY       Order = not_started
        CAUSES           Order = saved
    ACTION ACT_Modify
        REQUIRED         Order = saved
        CAUSES           Order = saved, Order = submitted
    ACTION ACT_Submit
        ALLOWED_BY       Order = saved
        CAUSES           Order = submitted
    ACTION ACT_Cancel
        ALLOWED_BY       Order = saved OR Order = submitted
        INHIBITED_BY     Billing = Paid
        CAUSES           Order = cancelled
    ...
    SYNCHRONIZE Order = cancelled TO Shipping = not_started
    ...
}
```

In general, and as depicted in the above example, a schema specification defines the constraints on each AA, the state transitions caused by each AAs (i.e., the possible values of the associated SV if the action is performed), and events such as status synchronizers.

Multiple types of constraints can be defined for each AA. In some examples, an action is executable if any one of the ALLOWED_BY constraints is true (i.e., multiple constraints joined by logical OR operations), all REQUIRED constraints are true (i.e., multiple constraints joined by logical AND operation), and none of the INHIBITED_BY constraints is true (i.e., each condition is negated and then joined by logical AND). In some examples, the CAUSES part of an ACTION specification in the schema indicates the effect of the action. In some examples, CAUSES having two or more parts indicates that the result of the AA is non-deterministic (e.g., the modify action in the example schema model above). In some examples, SYNCHRONIZE denotes an event that sets a second SV to the specified value when a first SV is assigned a certain value.

As discussed herein, a goal specification can be generated and can be used to validate the BO model. In general, goals can include primary goals and recovery goals and can be provided as complex conditions, which may hold in a single state or in sets of states. In some examples, goals can be defined as desired assignments of a set of SVs that can be combined using logical operators. In the example context, an example goal specification can be provided as:

```
//Goal and goal category specification
GOAL goal_1 STATE Order = submitted AND
                Billing=invoice_done
GOAL goal_2 STATE Order = submitted AND
                Billing = cancelled
GOAL_CATEGORY goalcat_1 SET (goal_1 OR goal_2)
```

A goal category is specified using pre-defined goal states, which are combined with logical and set operators. In general, goal categories are specified at the end of the goal specification for verification purposes.

As discussed above, a FSM is generated based on the SAM model (BO model). In some implementations, the SAM model is mapped onto a FSM, and the FSM is used for the verification of the BO and schema models in view of the goals. Each state of the FSM can be represented as a status vector that describes the status of the BO at the particular state. In some examples, the status vector is provided based on each of the SVs of the BO and the respective values of the SVs at the particular state. In some examples, an initial state of the FSM represents a complete assignment of each of the SVs to their initial values. Transition relations capture the fact that the values of the SVs change due to the effects of AAs.

Figure 4:
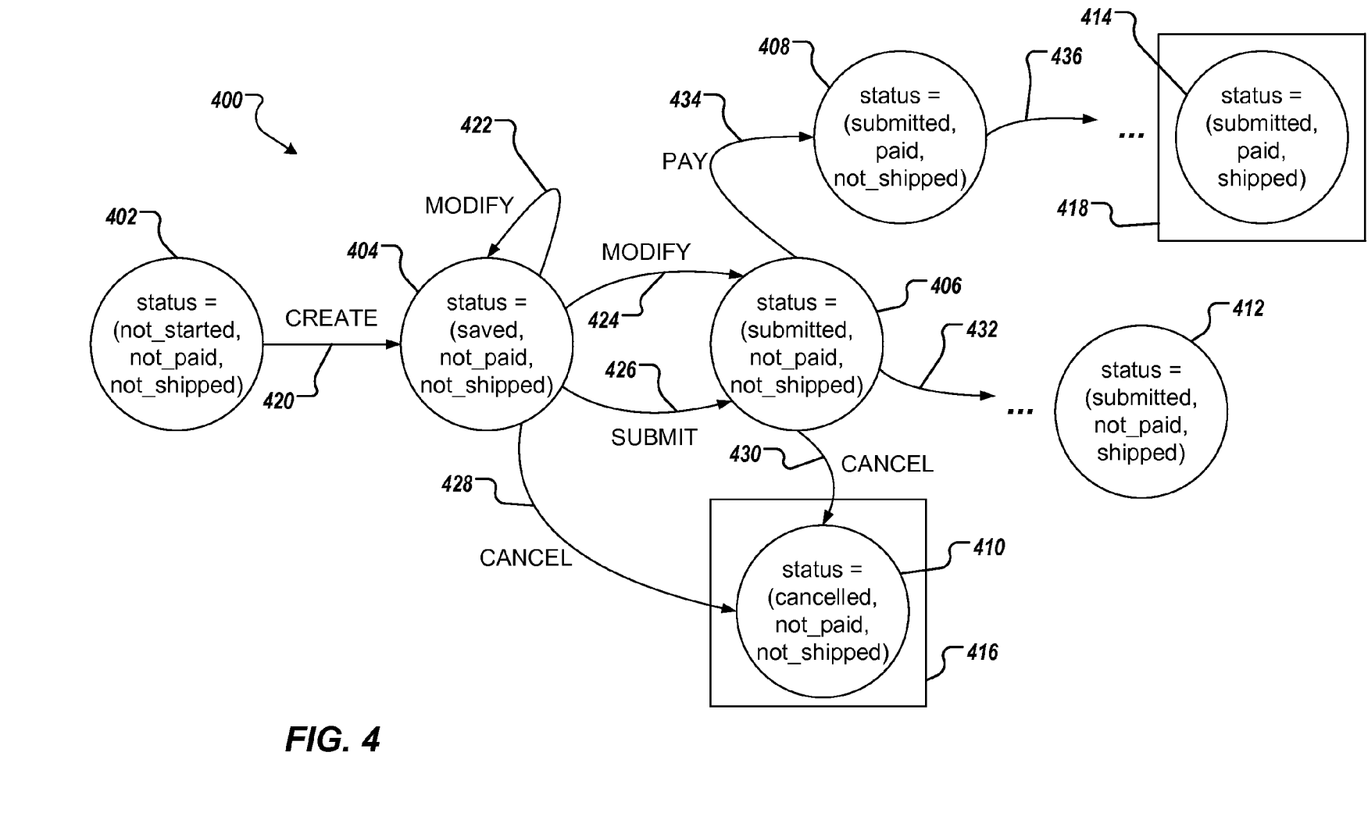
FIG. 4 depicts an example state diagram based on the example context.

FIG. 4 depicts an example state diagram 400 based on the example context. It is appreciated that the example state diagram 400 depicts a portion of the sales order process 200 of FIG. 2A and reflects a portion of the SAM model of FIG. 3. The example state diagram includes a root node 402, intermediate nodes 404, 406, 408 and leaf nodes 410, 412, 414, where each node represents a status of, in the example context, a sales order BO, and edges between nodes represent actions (AAs) that can be performed on the BO to transition the status of the BO to another state. Boxes 416, 418 indicate that the leaf nodes 410, 414, respectively, represent goal states.

In the example context the status of a sales order BO can be represented by a status vector provided as a set of values for each of the SVs associated with the BO. Example SVs include Status_Order, Status_Billing (depicted in FIG. 3) and Status_Shipping (not depicted in FIG. 3). For purposes of clarity and simplicity, only changes to the values of Status_Order and Status_Billing SVs are discussed in further detail herein. Accordingly, an example status vector for the sales order BO can be defined as:

status=(Status_Order, Status_Billing, Status_Shipping), where each of Status_Order, Status_Billing, Status_Shipping is a placeholder for one of the respective, allowed values.

In the example context, and as discussed above, example values for the Status_Order SV include "not_started," "saved," "submitted," and "cancelled," and example values for the Status_Billing SV include "not_paid," "paid," "invoice done," "failed," and "cancelled."

With continued reference to FIG. 4, the root node 402 reflect an initial state of the sales order BO, defined as:

status=(not_started, not_paid, not_shipped)

An edge 420 represents the "create" action that can be performed to transition the sales order BO from the initial state to an intermediate state represented by the intermediate node 404 and defined as:

status=(saved, not_paid, not_shipped)

An edge 422 represents the "modify" action that can be perform some modification to the sales order BO, while transitioning back to the intermediate state represented by the intermediate node 404. An edge 424 represents the "modify" action that can be performed to transition the sales order BO from the intermediate state represented by the intermediate node 404 to the intermediate state represented by the intermediate node 406 and defined as:

status=(submitted, not_paid, not_shipped)

An edge 426 represents the "submit" action that can be performed to transition the sales order BO from the intermediate state 404 to the intermediate state represented by the intermediate node 406. An edge 428 represents the "cancel" action that can be performed to transition the sales order BO from the intermediate state represented by the intermediate node 404 to the final state represented by the leaf node 410 and defined as:

status=(cancelled, not_paid, not_shipped)

An edge 430 represents the "cancel" action that can be performed to transition the sales order BO from the intermediate state represented by the intermediate node 406 to the final state represented by the leaf node 410.

An edge 432 and an ellipses represent one or more actions and/or intermediate states that can be performed or achieved, respectively, to transition the sales order BO from the intermediate state represented by the intermediate node 406 to the final state represented by the leaf node 412 defined as:

status=(submitted, not_paid, shipped)

An edge 434 represents the "pay" action that can be performed to transition the sales order BO from the intermediate state represented by the intermediate node 406 to the intermediate state represented by the intermediate node 408 and defined as:

status=(submitted, paid, not_shipped)

An edge 436 and an ellipses represent one or more actions and/or intermediate states that can be performed or achieved, respectively, to transition the sales order BO from the intermediate state represented by the intermediate node 408 to the final state represented by the leaf node 414 defined as:

status=(submitted, paid, shipped)

Although an example FSM is graphically represented above (i.e., in FIG. 4), it is appreciated that the FSM can be represented, or encoded in a machine-readable language within a document (e.g., a document that can be processed by one or more computing devices). More specifically, representing the SAM schema in terms of a FSM enables encoding of the SAM schema as input program code of a computer-executable model checking tool for validating the SAM schema. In the encoded schema model (i.e., the FSM), the verification criteria are expressed as logical assertions that can be checked for validity and violations thereof can be reported.

As discussed above, the SAM schema (BO model) can be validated based on the FSM and the defined goals (e.g., using a computer-executable model checking tool). To illustrate such validation, the example state diagram 400 and example goals are referenced within the example context discussed above. The example goals can include the final status represented by the leaf node 414 of FIG. 4 (i.e., status=(submitted, paid, shipped)) and the final status represented by the leaf node 410 of FIG. 4 (i.e., status=(cancelled, not_paid, not_shipped)) (hence the respective boxes 416, 418). In the depicted example, the leaf node 414 is provided as a primary goal and the leaf node 410 is provided as a recovery goal. In some implementations, traces through the FSM can be generated, each trace defining a path of status vectors and actions that are possible through the SAM schema.

As also discussed above, a SAM schema meets a goal if and only if at least one status vector of every primary goal appears in at least one trace; every maximal finite trace ends in a status (state) vector of any primary goal or recovery goal; and from every status vectors of every infinite trace (i.e., loop), a status vector of any primary goal or recovery goal is reachable starting from the status vector(s) (e.g., by the same trace or another trace). In the example of FIG. 4, the goals represented by the leaf nodes 410, 414 appear in at least one trace, however, not every maximal finite trace ends in a goal. For example, a finite trace is provided that ends in the final status represented by the leaf node 412, which final status is not a goal. Consequently, the SAM schema represented by the state diagram 400 of FIG. 4 is invalid.

In some examples, if the SAM schema is determined to be invalid, one or more traces that resulted in the invalid status of the SAM schema can be displayed to a user on a display. In this manner, the user can be made aware of problematic traces and can revise the invalid SAM schema to provide a valid SAM schema.

Figure 5:
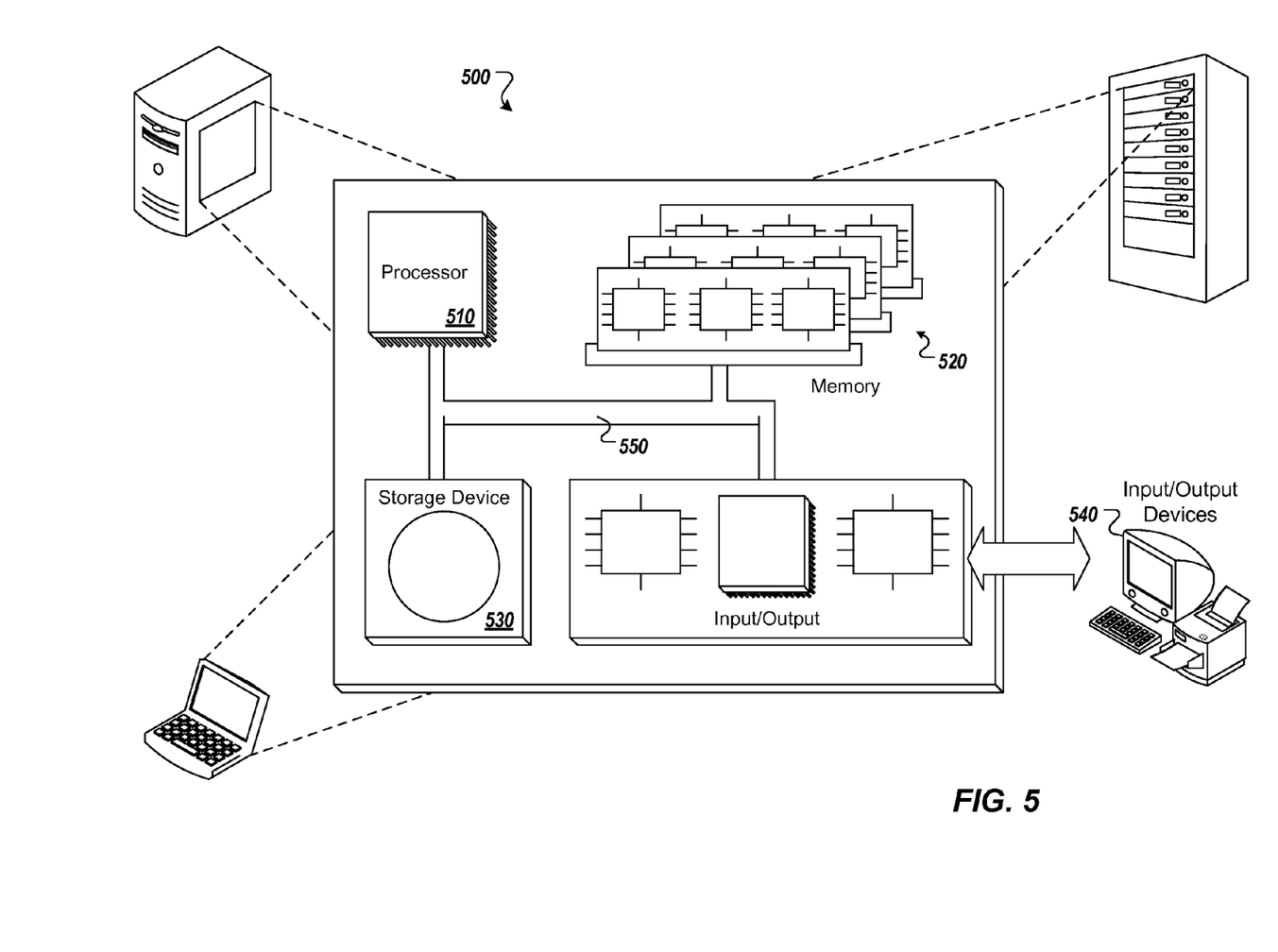
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for evaluating a validity of a status and action management (SAM) schema, the method being executed using one or more processors and comprising:
receiving, by the one or more processors, the SAM schema, the SAM schema being stored as a computer-readable document in memory;
providing, by the one or more processors, one or more goals, each goal representing an intention of the SAM schema, the one or more goals being provided in a computer-readable document stored in memory and comprising one or more primary goals and one or more recovery goals that each express an intention of a process underlying the SAM schema, each primary goal being an end goal representing a final outcome of a trace defining a path of status vectors and each recovery goal being an acceptable intermediate goal reachable in lieu of one of the one or more primary goals;
providing a finite state machine (FSM) based on the SAM schema, the FSM representing states of the SAM schema and transitions between states, the FSM being provided as a computer-readable document and being stored in memory, wherein processing further comprises processing the FSM; and
processing, by the one or more processors, the one or more goals using a computer-executable model checking tool for evaluating the validity of the SAM schema, wherein the SAM schema is determined to be valid, if at least one of the one or more primary goals or at least one of the one or more recovery goals is achieved for each trace of a plurality of traces.

2. The method of claim 1, wherein processing the FSM and the one or more goals comprises generating one or more traces and actions that are possible through the SAM schema.

3. The method of claim 2, wherein processing the FSM and the one or more goals further comprises:
determining that at least one status vector of a primary goal of the one or more goals appears in at least one trace;
determining that every maximal finite trace of the one or more traces ends in a status vector of any goal;
determining that from every status vector of any infinite trace, a status vector of any goal is reachable; and
in response, indicating that the SAM schema is valid.

4. The method of claim 2, wherein processing the FSM and the one or more goals further comprises:
determining that no status vector of a primary goal of the one or more goals appears in any trace; and
in response, indicating that the SAM schema is invalid.

5. The method of claim 2, wherein processing the FSM and the one or more goals further comprises:
determining that at least one maximal finite trace of the one or more traces does not end in a status vector of a goal; and
in response, indicating that the SAM schema is invalid.

6. The method of claim 2, wherein processing the FSM and the one or more goals further comprises:
determining that from at least one status vector of any infinite trace, a status vector of any goal is not reachable; and
in response, indicating that the SAM schema is invalid.

7. The method of claim 1, wherein each state is associated with a status vector, the status vector being defined as a set of variable values.

8. The method of claim 1, wherein each transition is associated with an action that can be performed to change a status vector.

9. The method of claim 1, wherein the SAM schema represents constraints on actions that can be performed to transition between states.

10. The method of claim 1, wherein a primary goal represents a desired goal of the process and a recovery goal represents an acceptable goal of the process.

11. The method of claim 1, wherein the process comprises a business process.

12. A non-transitory computer-readable storage medium coupled to one or more processors and having instructions stored thereon which, when executed by the one or more processors, cause the one or more processors to perform operations for evaluating a validity of a status and action management (SAM) schema, the operations comprising:
receiving the SAM schema, the SAM schema being stored as a computer-readable document in memory;
providing one or more goals, each goal representing an intention of the SAM schema, the one or more goals being provided in a computer-readable document stored in memory and comprising one or more primary goals and one or more recovery goals that each express an intention of a process underlying the SAM schema, each primary goal being an end goal representing a final outcome of a trace defining a path of status vectors and each recovery goal being an acceptable intermediate goal reachable in lieu of one of the one or more primary goals;
providing a finite state machine (FSM) based on the SAM schema, the FSM representing states of the SAM schema and transitions between states, the FSM being provided as a computer-readable document and being stored in memory, wherein processing further comprises processing the FSM; and
processing the one or more goals using a computer-executable model checking tool for evaluating the validity of the SAM schema, wherein the SAM schema is determined to be valid, if at least one of the one or more primary goals or at least one of the one or more recovery goals is achieved for each trace of a plurality of traces.

13. A system, comprising:
a computing device; and
a computer-readable storage device coupled to the computing device and having instructions stored thereon which, when executed by the computing device, cause the computing device to perform operations for evaluating a validity of a status and action management (SAM) schema, the operations comprising:
receiving the SAM schema, the SAM schema being stored as a computer-readable document in memory;
providing one or more goals, each goal representing an intention of the SAM schema, the one or more goals being provided in a computer-readable document stored in memory and comprising one or more primary goals and one or more recovery goals that each express an intention of a process underlying the SAM schema, each primary goal being an end goal representing a final outcome of a trace defining a path of status vectors and each recovery goal being an acceptable intermediate goal reachable in lieu of one of the one or more primary goals;

providing a finite state machine (FSM) based on the SAM schema, the FSM representing states of the SAM schema and transitions between states, the FSM being provided as a computer-readable document and being stored in memory, wherein processing further comprises processing the FSM; and processing the one or more goals using a computer-executable model checking tool for evaluating the validity of the SAM schema, wherein the SAM schema is determined to be valid, if at least one of the one or more primary goals or at least one of the one or more recovery goals is achieved for each trace of a plurality of traces.

* * * * *